Dec. 19, 1967   W. A. THORNGREN, SR   3,358,586
UTENSIL HOLDER
Filed April 20, 1966                    2 Sheets-Sheet 1

INVENTOR
WALTER A. THORNGREN SR.

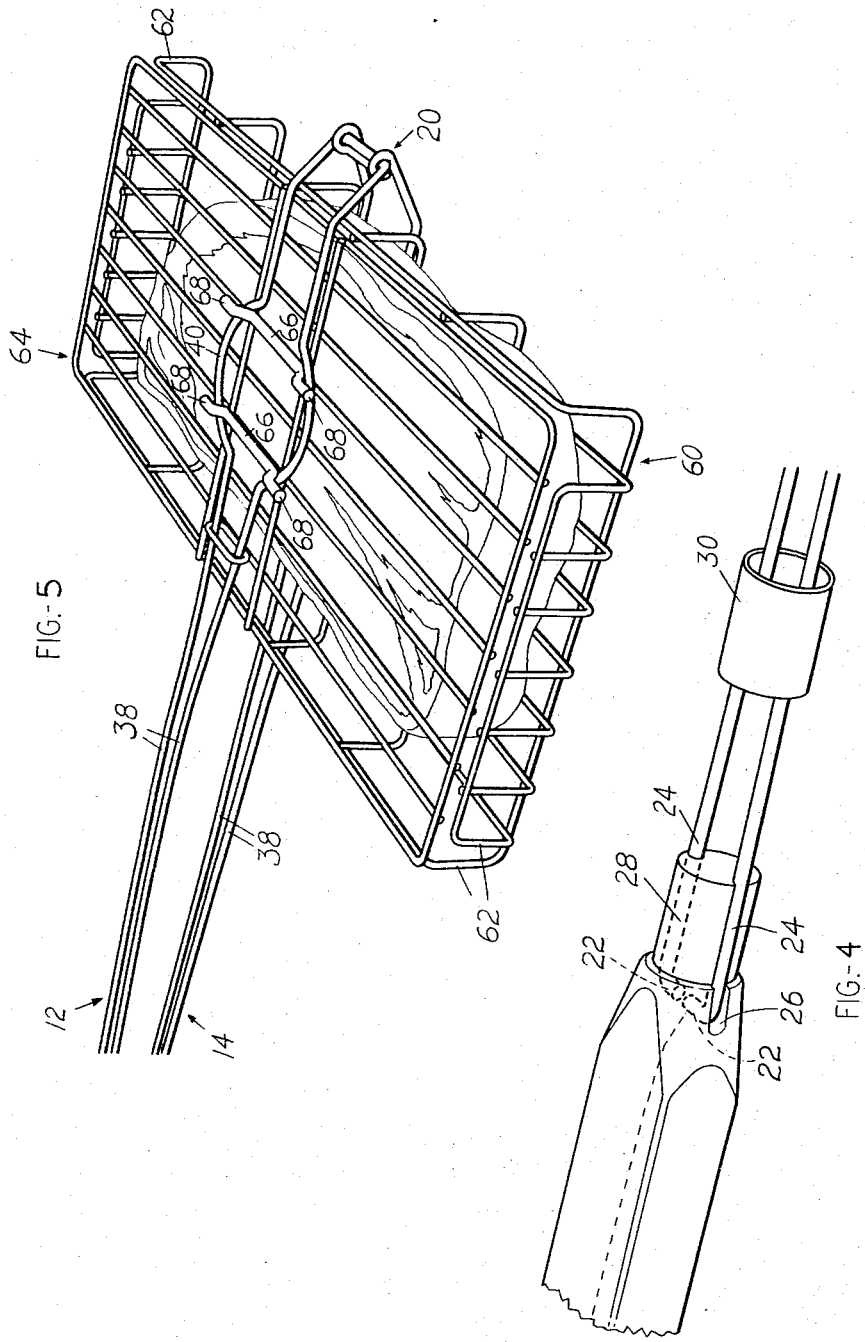

United States Patent Office 3,358,586
Patented Dec. 19, 1967

3,358,586
UTENSIL HOLDER
Walter A. Thorngren, Sr., 1572 Blackhawk Road,
Moline, Ill. 61265
Filed Apr. 20, 1966, Ser. No. 543,852
9 Claims. (Cl. 99—402)

The present invention relates generally to a cooking device.

It is an object of this invention to provide in a device having two relatively movable frame members hingedly secured to each other a novel frame construction to which a variety of novel cooking utensils may be secured, each of the frame members being fabricated from preformed resilient steel wires that are adapted to be sprung apart whereby a novel utensil having an outwardly projecting frame receiving portion may be secured between the wires, there also being means to hold the wires from movement away from each other thereby securely holding the utensil in place.

Another object of this invention is the provision of novel means to hold certain utensils securely in their sealed position.

A further object of this invention is the provision of an improved hinge construction.

Another object of this invention is the provision of an improved construction for securing the handles to the frame members.

These and other objects and advantages of this invention will be apparent to those skilled in the art after a consideration of the following detailed description, taken in conjunction with the accompanying drawings in which the preferred form of this invention is illustrated.

FIG. 4 is an enlarged detail view of the handle construction.

FIG. 5 is a perspective view of the utensil holder of this invention in which a grill has been removably secured.

Figure 1:
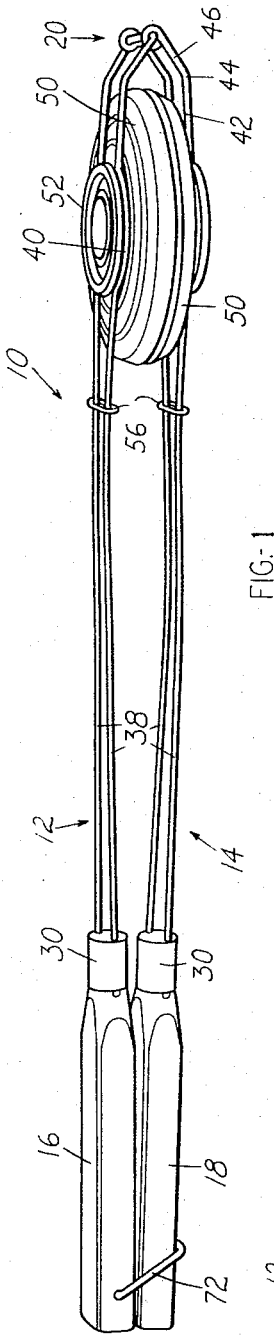
FIG. 1 is a perspective view of the utensil holder of this invention to which a pie iron is removably secured.

The utensil holder, indicated generally at 10, is formed of two opposed frame member 12, 14, which are hingedly interconnected at one end. Handles 16 and 18 are secured to the opposite ends of the frame members 12 and 14, respectively. The portion of each of the frame members 12, 14 disposed between the hinge 20 and the associated handle, and including the hinge 20, is formed from a single piece of resilient steel wire. As can best be seen from FIG. 4 the ends of 22 of each of the wires are turned in towards each other and are received within a transverse aperture in the associated handle. The portion of the wire, indicated at 24, adjacent the inturned ends 22 are disposed within longitudinal grooves 26 of the reduced end portion 28 of the adjacent handle and are rigidly secured in place by a metal ferrule 30 which closely embraces the handle portion 28.

Figure 3:
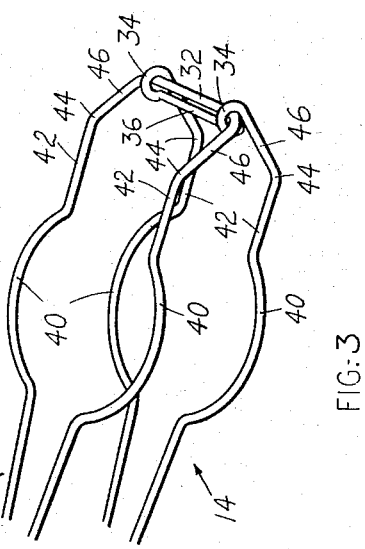
FIG. 3 is an enlarged perspective view of the utensil holder of this invention showing the hinge construction.

The hinge 20 is formed, as can best be seen from FIG. 3, by embracing the bight portion of the wire 12 by the intermediate portion of the wire 14. To this end the intermediate portion of the wire 14 is formed with two spaced apart annular portions 34 which are wrapped in the same direction about the ends of the bight 32, the annular portions being interconnected by a portion 36 which is parallel to the bight portion 32.

Figure 2:
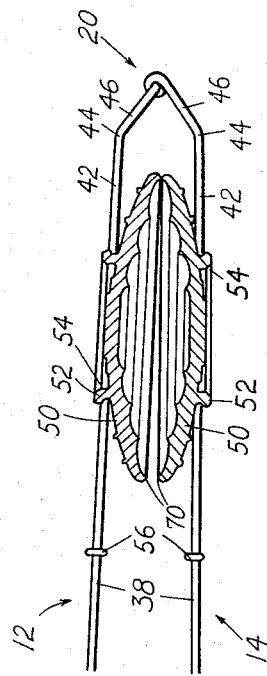
FIG. 2 is a sectional view of the utensil holder and pie iron shown in FIG. 1 in which the parts are shown in their free or unclamped position.

The wires of the frame members 12 and 14 between the hinge 20 and the handles 16 and 18 are substantially identical and formed with two opposed portions, each of which has an elongated portion 38 which extends from the ferrule 30 to a curve engaging portion 40. A relatively short length of straight wire 42 extends from the curved portion 40 to a bend 44, the bend 44 in turn being interconnected with the hinge 20 by straight length 46. As can be seen from FIG. 2 the parts 38, 40, 42 of each of the members 12, 14, are normally disposed within a plane, the lengths 46 extending inwardly from the plane towards the hinge 20.

It is a feature of this invention that different utensils may be secured to the holder 10. Thus as can be seen from FIG. 1 a pair of pie irons 50 are secured to the frame members 12, 14. To this end each iron is provided with an upstanding ring 52 which is provided with a groove 54. The pie irons are secured to the members 12, 14 by disposing the curved portions 40 of the opposed portions of each of the wires 12, 14 within the groove 54. The curved portions are secured within the groove 54 by sliding a ring 56 along the opposed portions 38. To this end it should be noted that the opposed portions 38 are normally disposed further apart from each other adjacent the curved portions 40 than they are remote from the curved portions. The rings are so sized that as they move towards the curved portions they draw the opposed curved portions 40 towards each other thereby tightly securing the utensil within the utensil holder.

FIG. 5 illustrates another utensil which is designed for use with the utensil holder 10. This utensil has a basket grill 60 having upturned edges 62, and a cover grill 64. A pair of rods 66 are welded or secured in any other suitable manner to the grills 60, 64, the ends 68 of each of the rods being disposed outwardly of the grill in such a manner that the curved portion of the wires 12, 14 may be secured between the ends 68 and the associated grill.

In operation when using the pie irons the parts are so shaped with respect to each other that the handles are first swung towards each other until the mating surfaces 70 closest the hinge 20 contact each other. The mating surfaces remote from the hinge will not initially contact each other as can best be seen from FIG. 2. The initial contact of the mating surfaces adjacent the hinge side is achieved by so dimensioning the parts that the distance between the grooves 54 of two opposed pie irons when placed in mating contact is greater than the distance between the plane of the portions 38, 40, 42 of each of the frames when swung to a position where they are parallel to each other. Continued movement of the handles towards each other will cause the surfaces 70 to contact each other about their entire periphery causing the section 42, 44, 46 to bow, and still further movement of the handles towards each other will cause the elongated portions 38 to bow. The bowing of the wires 12, 14 to either side of the attachment to the pie iron will cause the wires to exert considerable force along the entire periphery of the pie irons thus firmly holding the surfaces 70 in engagement. The handle 16 is provided with a bail 72 adaptable to be swung over the handle 18 to hold the assembly together in its normal working position.

While the preferred structure in which the principles of the present invention have been incorporated is shown and described above it is to be understood that the invention is not to be limited to the particular details, shown and described above, but that, in fact, widely different means may be employed in the practice of the broader aspects of this invention.

What is claimed is:

1. A utensil holder comprising: first and second frame members, handle means at one end of said frame members, hinge means interconnecting the other end of said first and second frame members, each of said frame members having a pair of opposed utensil engaging means, said opposed engaging means of each pair normally being movable apart whereby a utensil may be received between them, and holding means operable to hold said engaging means from outward movement to secure the utensil therebetween.

2. The utensil holder set forth in claim 1 in which each of said frame members includes opposed resilient steel wires extending from the handle portion to the hinge means, said engaging means being formed of said resilient steel wires and including curved sections which are adapted to be disposed about an outwardly extending portion of the utensil to be engaged, and said holding means including ring means disposed about said wires adjacent said curved sections and movable towards and away from said curved sections.

3. The utensil holder set forth in claim 2 wherein the hinge is formed from said resilient steel wires, the steel wire of one of said frame members being formed with an elongated transverse bight portion, and the steel wire of the other of said frame members being formed with a transverse bight connected to the opposed bight by two opposed annular portions.

4. The utensil holder set forth in claim 2 in which each of the opposed steel wires is formed with transversely disposed end portions, each of said handles being formed with opposed grooves terminating in a transverse aperture, and ferrule means disposed about said wires to hold them in said grooves and apertures.

5. The utensil holder set forth in claim 2 further characterized by the provision of a pair of opposed grills, each of said grills having a pair of rods secured thereto, the outer ends of the rods being disposed outwardly of the grills to receive therebetween said curved portions.

6. The utensil holder set forth in claim 5 in which one of said grills is provided with upwardly extending sides, the other of said grills being disposable between said sides.

7. The utensil holder set forth in claim 1 further characterized by the provision of a pair of opposed pie irons, each of said pie irons having an outwardly extending grooved portion engaged by said holding means, and a surface adapted to mate with a corresponding surface of an opposed pie iron.

8. The utensil holder set forth in claim 7 in which the mating surfaces and grooved portion of each pie iron are substantially parallel to each other, the distance between the grooved portions of two opposed pie irons being greater than the distance between the engaging means of the first and second frame members when parallel to each other whereby when the frame members are initially closed towards each other the irons initially contact nearest the hinge.

9. The utensil holder set forth in claim 8 in which each of said frame members includes opposed resilient steel wires extending from the handle portion to the hinge means, said opposed engaging means being formed of said resilient steel wires and including curved sections which are adapted to be disposed about the grooved portion of the outwardly extending means on the pie irons, said holding means comprising ring means disposed about said wires adjacent said curved sections and movable towards and away from said curved sections, and the hinge being formed from said resilient steel wires, the steel wire of one of said frame members being formed with an elongated transverse bight portion, and the steel wire of the other of said frame members being formed with a transverse bight connected to the opposed bight by two opposed annular portions.

References Cited

UNITED STATES PATENTS

| 224,761 | 2/1880 | Applegate et al. | 99—402 |
|---|---|---|---|
| 585,432 | 6/1897 | Devoll | 99—402 |
| 1,768,311 | 6/1930 | Fahrnkopf | 294—33 |
| 1,795,260 | 3/1931 | Milldown | 294—28 |
| 1,874,608 | 8/1932 | Parr | 99—383 |
| 1,945,165 | 1/1934 | Smith | 99—402 XR |
| 1,976,623 | 10/1934 | Monroe et al. | 294—31 XR |
| 2,463,439 | 3/1949 | Streitelmeier | 99—380 XR |
| 2,582,692 | 1/1952 | Funke. | |
| 2,594,500 | 4/1952 | Runnoe | 99—394 XR |
| 2,658,788 | 11/1953 | Crich | 294—33 XR |

FOREIGN PATENTS

| 690,233 | 4/1953 | Great Britain. |
|---|---|---|

WALTER A. SCHEEL, *Primary Examiner.*

J. M. NEARY, *Assistant Examiner.*